March 10, 1931.      L. W. BLYMYER      1,795,707
CIRCUIT CONTROLLER
Filed Oct. 10, 1927     2 Sheets-Sheet 1
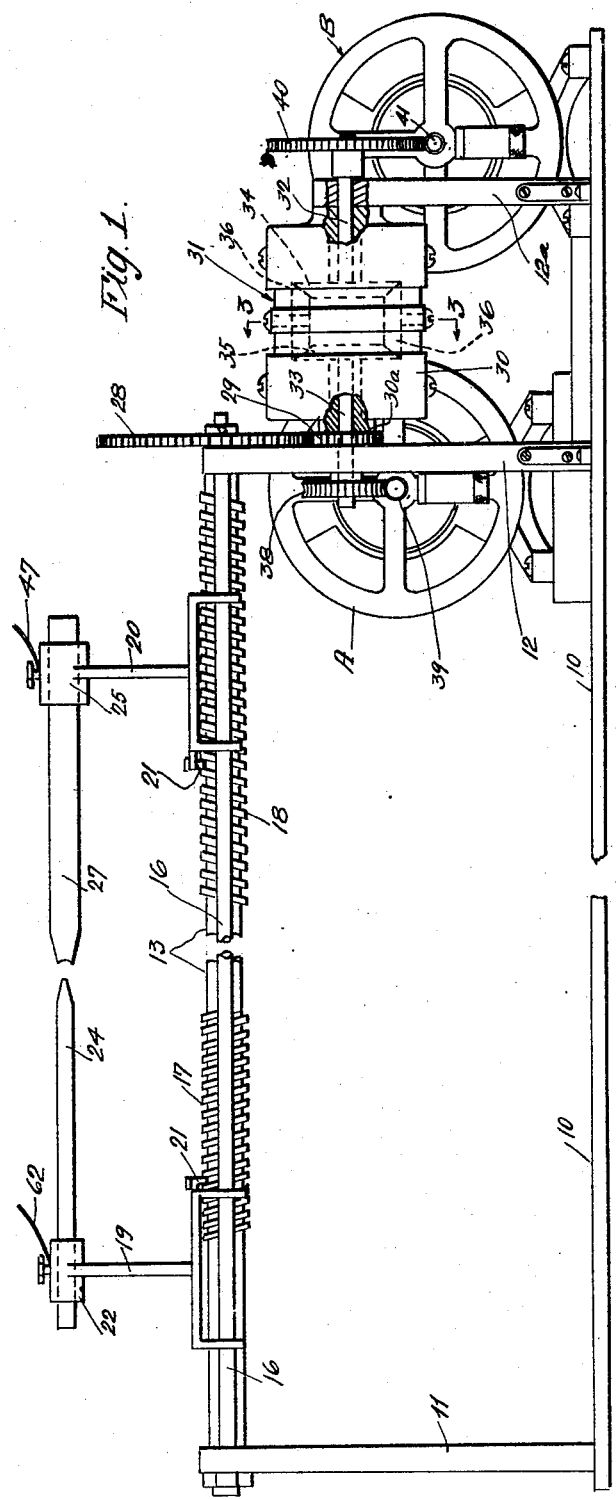
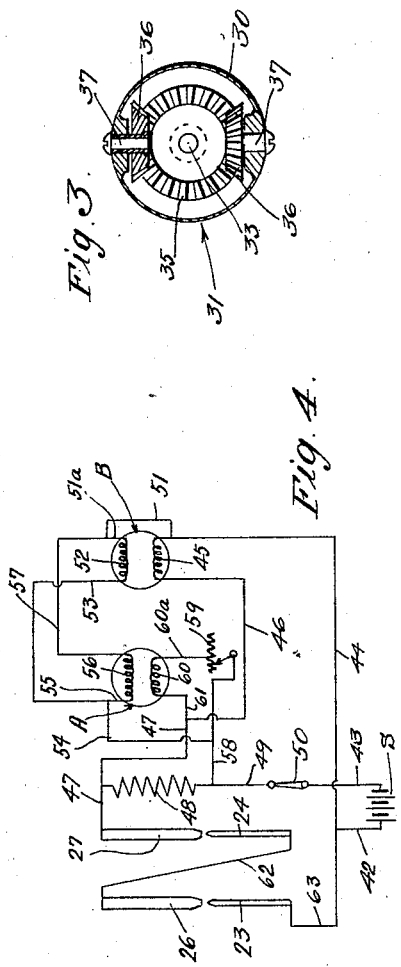
Inventor:
Lafayette W. Blymyer.
Attorney.

March 10, 1931. L. W. BLYMYER 1,795,707
CIRCUIT CONTROLLER
Filed Oct. 10, 1927 2 Sheets-Sheet 2
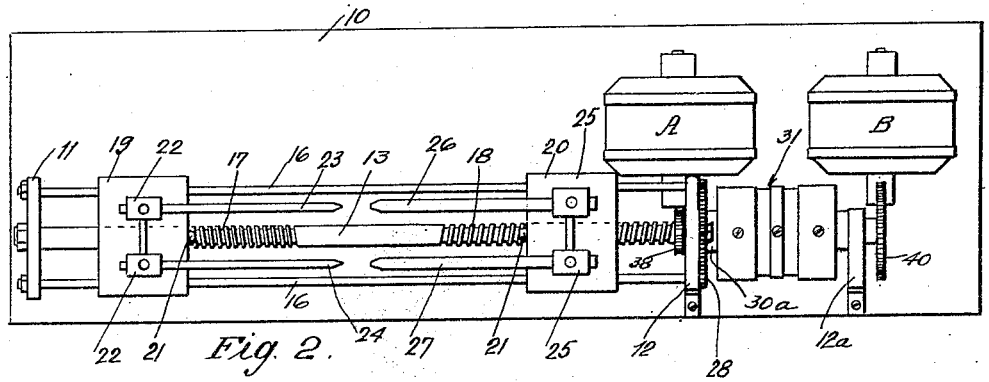
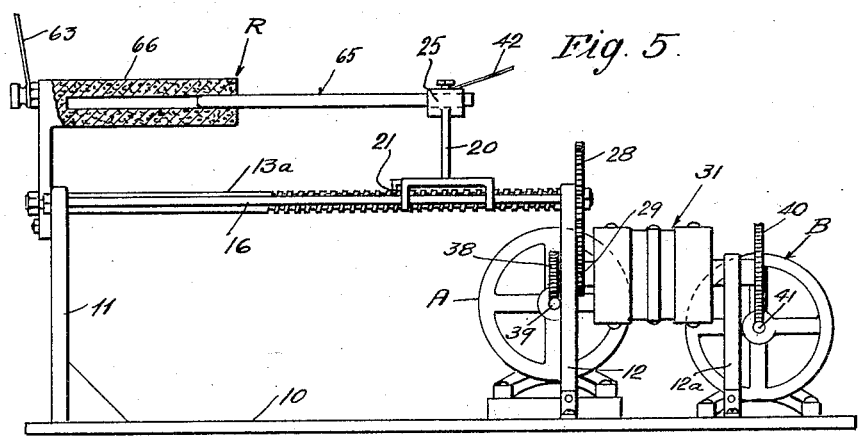
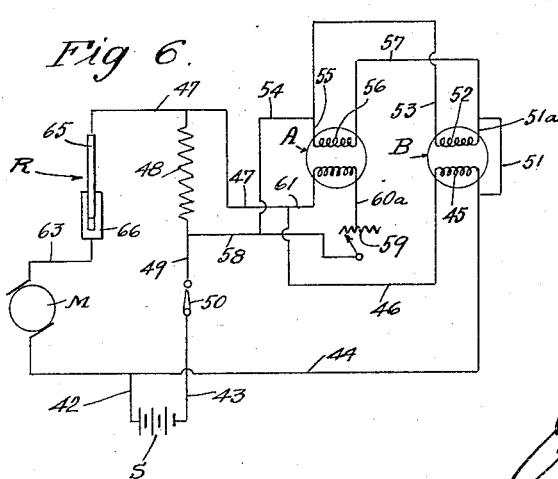
Inventor.
Lafayette W. Blymyer.
Attorney.

Patented Mar. 10, 1931

1,795,707

UNITED STATES PATENT OFFICE

LAFAYETTE W. BLYMYER, OF LOS ANGELES, CALIFORNIA

CIRCUIT CONTROLLER

Application filed October 10, 1927. Serial No. 225,378.

This invention has to do generally with circuit controllers, and may be considered as a resistance controller for controlling and maintaining constant the resistance and current flow of a variable resistance circuit.

The invention may be applied to advantage in a situation where the controlling resistance element and the controlled resistance element, or, expressed otherwise, the varying resistance and varied resistance, respectively, are one and the same, as the carbons or electrodes of an arc light; or in a situation where the controlling or varying resistance is other than the controlled or varied resistance as when a rheostat is in circuit with a variably loaded motor. In the latter case, the motor is the varying or controlling element and the rheostat is the varied or controlled element.

The invention may also be considered as a novel arrangement for actuating a circuit controlling member. For instance, it is adapted to actuate mechanism for feeding or retracting the carbons (movement of which controls the arc voltage) of an arc lamp, or which may be adapted to actuate a D. C. generator voltage regulator.

Irrespective of its use, the invention contemplates an arrangement which is of a simple nature yet extremely sensitive and accurate. Its characteristics may be described to better advantage by reference to a typical situation, from an understanding of which those skilled in the art will readily appreciate how it may be adapted to other situations. Since the invention is capable of embodiment in an arc light with particular advantage, I have chosen to present such an embodiment as a preferred one, though this is not to be considered as limitative on the invention, considered in its broader aspects. It will be understood that whether the arc light be used for the projection of motion pictures for the purpose of illuminating scenes to be photographed, or for any other purpose, the invention may be applied with benefit, though it is especially beneficial when utilized in connection with the striking and feed of carbons of scene-illuminating lamps where it is of great importance to maintain a constant, steady illumination.

The controller includes a pair of electric motors connected through a differential to the element to be controlled. In the preferred embodiment of the invention, it is one or more of the carbons with which the motors are connected through the differential, though it will be understood that in other embodiments of the invention the elements to be controlled may be of a nature quite different.

I am aware that a single motor has been employed heretofore in a manner to operate through a differential to feed the carbons together, though such installations have required the use of mechanically operated governors for controlling the differential movement. Furthermore, such installations necessarily require manual striking of the arc since the motor is adapted only to move the carbons toward one another and therefore cannot be employed for establishing an arc gap. On the other hand, by virtue of my arrangement, the motors are adapted not only to maintain an arc gap of predetermined length after the arc has been struck, but also to strike the arc automatically, that is, when a control switch is closed the carbons are first fed together until they contact and then automatically spread apart until the arc gap is of predetermined length. Thereafter, this gap is automatically maintained by the feeding together of the carbons as the carbon tips are consumed.

It is well known, of course, that an arc at a given amperage operates most efficiently with the carbon tips a given distance apart (the distance varying with the amperage) and my device is adapted to maintain said tips at said given distance.

One of the motors is connected across the rheostat or grid of the arc, while the other motor is connected across the arc. Consequently, variations in grid and arc voltages affect the operation of the motors, and the general arrangement is such that this condition brings about the above described results.

The details of the arrangement may be discussed to better advantage in the following specification, but it may be said here that it has been found that this comparatively simple arrangement functions in a manner to give to the arc light great efficiency of operation, practically no attention being required of the operator except to replenish the carbons.

Other features of novelty and objects of the invention will be made apparent in the following detailed description, reference being had to the accompanying drawings, in which:

Fig. 1 is a side view of an embodiment of my invention;

Fig. 2 is a reduced plan view of Fig. 1;

Fig. 3 is a section on line 3—3 of Fig. 1;

Fig. 4 is a wiring diagram showing a preferred method of connecting the various elements electrically;

Fig. 5 is a view showing another adaptation of the invention; and

Fig. 6 is a wiring diagram showing the device of Fig. 5 in circuit.

As stated at the outset, the following description of a particular and preferred embodiment of the invention is not to be considered as limitative but rather, as illustrative, and the same view is to be taken of the construction details of the carbon feeding mechanism here described as being used in connection with this preferred embodiment. For instance, though I have here shown a mounting adapted to take two sets of carbons, the carbons of each set both being moved by the feeding and retractive mechanism, it will be understood the invention is equally applicable to lamps having only one or more than two sets of carbons, or to installations where only one carbon of a positive and negative pair is moved by the feeding and retractive mechanism.

Numeral 10 designates a base from which uprights 11, 12 extend. These uprights support a lead screw 13 and a pair of guide rails or rods 16, the rails preferably being equispaced from the lead screw and being axially parallel therewith. Since the illustrated mechanism is adapted to feed and retract both the positive and negative electrodes and since it is desirable that the movement be given to the electrodes from a single member 13, a given longitudinal extent of lead screw carries right hand threads and another portion carries left hand threads. For instance, lead screw 13 has right hand threads 17 and left hand threads 18.

Electrode carriers 19 and 20 are mounted on guide rails 16 for sliding movement longitudinally therealong, and they are provided with lugs or teeth 21 which engage the threads of the lead screw, it following that rotation of the latter simultaneously moves the carriages toward or away from each other.

Carrier 19 is provided with spaced heads 22 which support negative carbons or cathodes 23, 24, while carrier 20 has clamping heads 25 which support positive carbons or anodes 26, 27, said carbons being in axial alinement with carbons 23, 24, respectively. It follows that rotation of lead screw 13 in one direction or the other moves the positive and the negative carbons toward or away from one another. Since the positive carbons are consumed more quickly than are the negative, and since it is desirable to keep the point of illumination or arc fixed, threads 18 are preferably coarser than threads 17, the ratio being such that the positive electrodes are fed just enough faster than the negative to compensate the difference in rate of consumption.

Lead screw 13 carries a gear 28 which is in mesh with a spur gear 29, the latter being non-rotatably mounted on a coaxial extension 30a of cylindric housing 30 of the differential gearing device generally indicated at 31. The housing, in turn, is rotatably mounted on axially alined shafts 32 and 33 which are journaled in uprights 12a and 12, respectively. These shafts carry bevel gears 34 and 35, respectively, which are located within housing 30 and mesh with planetary pinions 36. Pinions 36 are mounted for rotation on spindles 37, the latter being supported by housing 30. Shaft 33 carries a worm gear 38 which operatively engages worm 39 directly driven by motor A. Shaft 32 carries a worm gear 40 which is adapted to be driven by worm 41, the latter being direct-connected to motor B.

The normal direction of rotations of the motors and the driving connection between them and the differential are such that with the motors operating at the same effective speed, pinions 36 rotate idly and housing 30 remains stationary. However, when one motor has greater effective speed than the other, pinions 36 are caused to planetate, the housing thereby being rotated in one direction or the other, depending upon which of the motors has the greater effective speed. The term "effective speed" is used due to the fact that, in the illustrated embodiment, worm gears 38 and 40 are of different sizes and consequently when shafts 33 and 32 are rotating at equal angular velocity, the speeds of motors A and B must be different. Therefore, in the illustrated case, the actual speed of motor A must be greater than that of motor B to give equal angular velocity to shafts 33 and 32, and since it is the speed of these shafts which is controlling upon the differential operation, the actual speed of each shaft may be considered as the effective speed of its motor.

It may be stated at this point that where I assign certain gear ratios, motor speeds or voltages, these are not to be considered at all as limitative on the invention, since they are arbitrarily chosen in order to point out a specific example from which a full understanding of the principles of operation may be had. For instance, it will be assumed that motor A is a variable speed motor designed to run at 500 R. P. M. on thirty-seven volts, and motor B a variable speed motor adapted to run at 1000 R. P. M. on seventy-three volts. For convenience, the voltage given may be termed "normal voltages" of the respective motors and the angular velocities given as the normal speeds of the motors. Since worm wheels 38 and 40 are in the ratio of 1 to 2, it will be seen that shafts 33 and 32 are rotated at equal speeds when the motors are driven at their respective normal speeds under normal voltage. Thus, when the voltages of the two motor circuits are normal, the effective speeds of the two motors are the same, though the actual speed of motor B is twice that of motor A. With the motors thus running in balance, it will be seen that pinions 36 idle and housing 30 remains stationary so no movement is transmitted to the lead screw and carbons. However, as soon as the motors become unbalanced due to voltage variations from normal, it will be seen that pinions 36 will be caused to planetate in one direction or the other and the rotating housing will then drive lead screw 13 through pinion 29 and gear 28, the rotation of the lead screw causing the carbons to move toward or away from each other depending upon which motor is running the faster, as far as effective speed is concerned.

It may be stated at this point, that the motors preferably are of a relatively slow speed type and their rotating parts are relatively light so as to have as little over-running proclivities as possible and be capable of responding instantaneously to voltage changes.

In Fig. 4 I have disclosed a preferred circuiting, though it will be understood this may be changed in certain respects without departing from the spirit and scope of the invention. The letter S indicates a source of electricity from which extend main leads or constant potential wires 42 and 43. For purposes of description, it will be assumed that the full line voltage is 110 volts. Wire 44 leads from wire 42 through the armature circuit 45 of motor B. Wire 46 leads from the last-named circuit to wire 47, the latter leading to electrode 27 and also to the grid or fixed resistance 48 for the arc current. Wire 49 leads from grid 48 through line-control switch 50 to wire 43. Wire 51 leads from wire 44 to wire 51a which leads to the field circuit 52 of motor B, and wire 53 leads from the last-named circuit to wire 54 and to wire 55, said wire 55 being connected into the field circuit 56 of motor A, there being a wire 57 from circuit 56 to wire 51a. Wire 54 leads to wire 58 which ties into wire 49 and extends to the variable resistance or rheostat 59. Wire 60a leads from the variable resistance through the armature circuit 60 of motor A, and wire 61 leads from circuit 60 to wire 47. Wire 62 connects electrodes 24 and 26, and wire 63 leads from electrode 23 to wire 42.

The operation of the device may be described best by considering a typical cycle of operation, it being assumed first that switch 50 is open and the negative carbons separated from the positive carbons by virtue of the preceding operation of the device. Now it will be noted that motor A is connected across the rheostat or grid of the arc and that only when the arc is burning properly the arc voltage is 73 or normal and the motor is caused to run at normal effective speed.

When the switch 50 is closed, motor B gets the full line voltage, (which is, of course, greater than its normal voltage, i. e. 37 volts) except for the drop caused by the normal resistance of grid 48 and consequently runs above normal effective speed. On the other hand, since motor A is connected across the grid, it does not initially receive any current. Thus, with motor A at rest and motor B running above normal speed, the differential housing is rotated comparatively rapidly and the gear and lead screw connections are such that its direction of rotation is proper to revolve screw 13 in a direction to feed the carbons together. As soon as the carbons touch, the voltage across the arc drops below normal, and rises across the grid. As is evident, this variation in voltages slows motor B below normal speed and motor A starts up and runs above normal speed because it is shunted across grid 48. This action reverses the direction of rotation of housing 30 and of lead screw 13, the carbons, which may be considered as circuit controlling as well as circuit controlled members, thus being drawn apart or retracted. As soon as the carbons are at such a distance apart that the arc voltage is proper, both motors get their normal voltage and therefore run at normal speed or in balance. Consequently, housing 30 remains stationary, and no movement is imparted to the carbon carriers until there is a variation in this arc voltage.

When the carbons burn away and thus increase the arc gap, the arc voltage rises and the voltage across the grid lowers. This increases the speed of motor B above normal, and reduces the speed of motor A below normal, causing the differential housing 30 to rotate in the direction proper to feed the carbons together. Thus, the speed of the motor A is inversely proportional to the arc voltage, while the speed of the motor B is inversely proportional to the voltage across the grid, and therefore directly proportional to the arc voltage. The two motors may therefore be considered to be relatively operated in inverse speed-responsiveness to the arc voltage. As soon as the gap is restored to proper length, the motors again receive normal voltage and again run at normal speed, with the result set forth above. In actual operation, the motors and circuit are so sensitive that the carbons are feeding together practically constantly, but this feed is so even that it is almost unnoticeable and the light value of the arc remains practically constant, to obvious advantage.

It will thus be seen that the device is adapted to strike the arc automatically and then maintain the arc gap constant, it being noted that the speed of the carbon carriers during striking is much greater than when they are fed together during periods of burning since during the striking operation motor A holds gear 35 stationary, while, during the normal feeding, said motor is running, though usually at a little less than at normal speed and gear 35 is rotating.

It may be stated that while the wiring diagram shows the field coils of the motors connected across the full line voltage, the armature of motor A across the grid and the armature of motor B across the arc or rather, across two arcs in series, it will be understood this is not essential to successful operation of the arc control, though it is particularly efficient since the speed change is greater for a slight change in voltage than would be the case were a motor to be used as a straight shunt motor. Thus various motor circuitings may be utilized, and for this reason the motor circuits connected across the arc and grid to be operated and controlled by the respective potentials thereacross may be considered as the speed-controlling motor circuits.

Motor B may be considered as the carbon advancing or feeding member, and motor A as the carbon retractor.

It will be readily appreciated that the above described control may be adapted to control a single, double or triple arc taking any chosen amperage and voltage, it only being necessary to vary the motors to run normally at predetermined voltages and connecting them to the differential and carbons with the proper drive-connection ratios.

In Figs. 5 and 6, I have shown a slight variation wherein a motor M, which may be considered as operating under variable load, is introduced in the circuit between, for instance, wires 63 and 42, and a variable resistance R substituted for the carbons or electrodes of the other figures. The rest of the hook-up may be as described above, the situation here being that motor M is the varying or controlling resistance and rheostat R is the varied or controlled resistance. This rheostat may be of any type embodying a movable control element, in this case said element being in the form of a carbon plunger 65 mounted on carrier 20 and adapted to be reciprocated through the stationarily mounted pot 66 having a graphite filler. It will be seen that variations in the resistance offered by the motor due to its varying load serves to move carbon plunger 65 into and out of pot 66 in a manner equivalent to the movement of carbons in Fig. 4 towards and away from each other, this movement of the plunger varying the effective resistance of rheostat R.

It will be understood the drawings and description are to be considered merely as illustrative of and not restrictive on the broader claims appended hereto, for various changes in design, structure and arrangement may be made without departing from the spirit and scope of said claims.

I claim:

1. In an arc lamp, a pair of electrodes in circuit with a pair of constant potential mains, a resistance element in one of the mains for controlling the arc current, one of said electrodes being mounted for movement toward and away from the other, a pair of motors, one of the motors having a speed-controlling energizing circuit connected across the resistance and the other motor having a speed-controlling energizing circuit connected across the arc gap, a pair of gears, one driven by each motor, a planetary gear meshing with the two gears, and means operatively connecting the planetary gear and said one electrode whereby planetation of said gear moves said one electrode with relation to the other.

2. In an arc lamp, a pair of electrodes in circuit with a pair of constant potential mains, a resistance element in one of the mains for controlling the arc current, said electrodes being mounted for movement toward and away from each other, a pair of motors, one of the motors having a speed-controlling energizing circuit connected across the resistance and the other motor having a speed-controlling energizing circuit connected across the arc gap, a pair of gears, one driven by each motor, a planetary gear meshing with the two gears, and means operatively connecting the planetary gear and said electrodes whereby planetation of said gear moves said electrodes with relation to each other.

3. In the art described, a pair of electrodes in circuit with potential mains, one of the electrodes being movable toward and away from the other, differential gearing for so moving the electrodes, and means for operating the gearing, said means embodying a pair of variable speed motors, and electrical circuiting whereby one of said motors is automatically operated in direct speed responsiveness to the arc voltage across the electrodes, and whereby the other of said motors is automatically operated in inverse speed responsiveness to the arc voltage across the electrodes.

In witness that I claim the foregoing I have hereunto subscribed my name this 16th day of May, 1927.

LAFAYETTE W. BLYMYER.